July 14, 1942.  G. L. HOGAN  2,289,425
DEVICE FOR ACCUMULATING, RETAINING, AND DISCHARGING HEAT
Filed Sept. 14, 1939  2 Sheets-Sheet 1
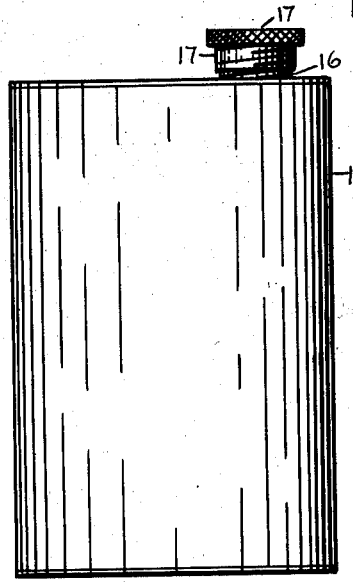
Fig. 1
Fig. 3
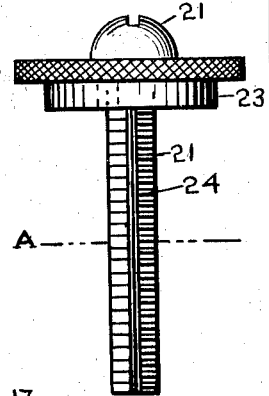
Fig. 5
Fig. 6
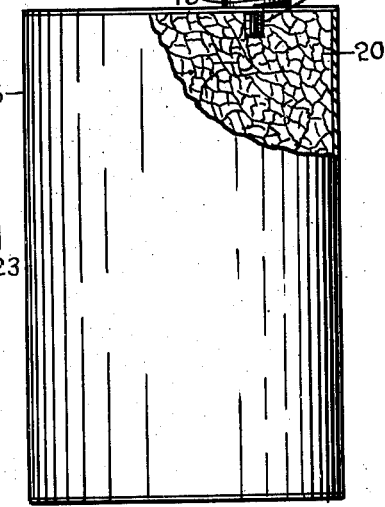
Fig. 4
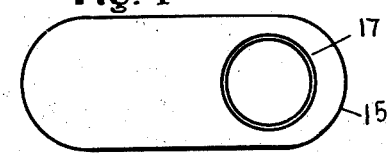
Fig. 2
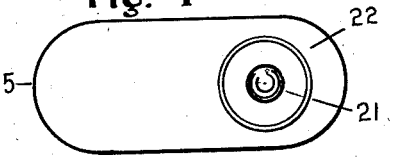
Fig. 7
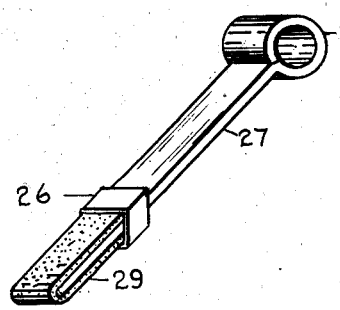
Fig. 8
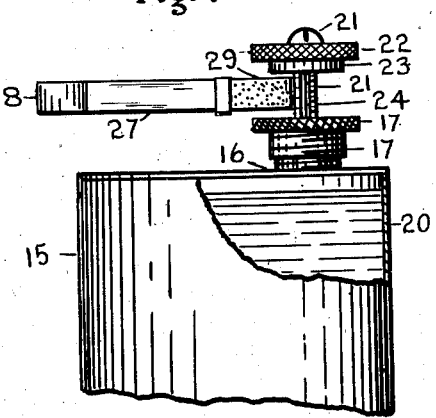
Fig. 9
Inventor
George Lewis Hogan

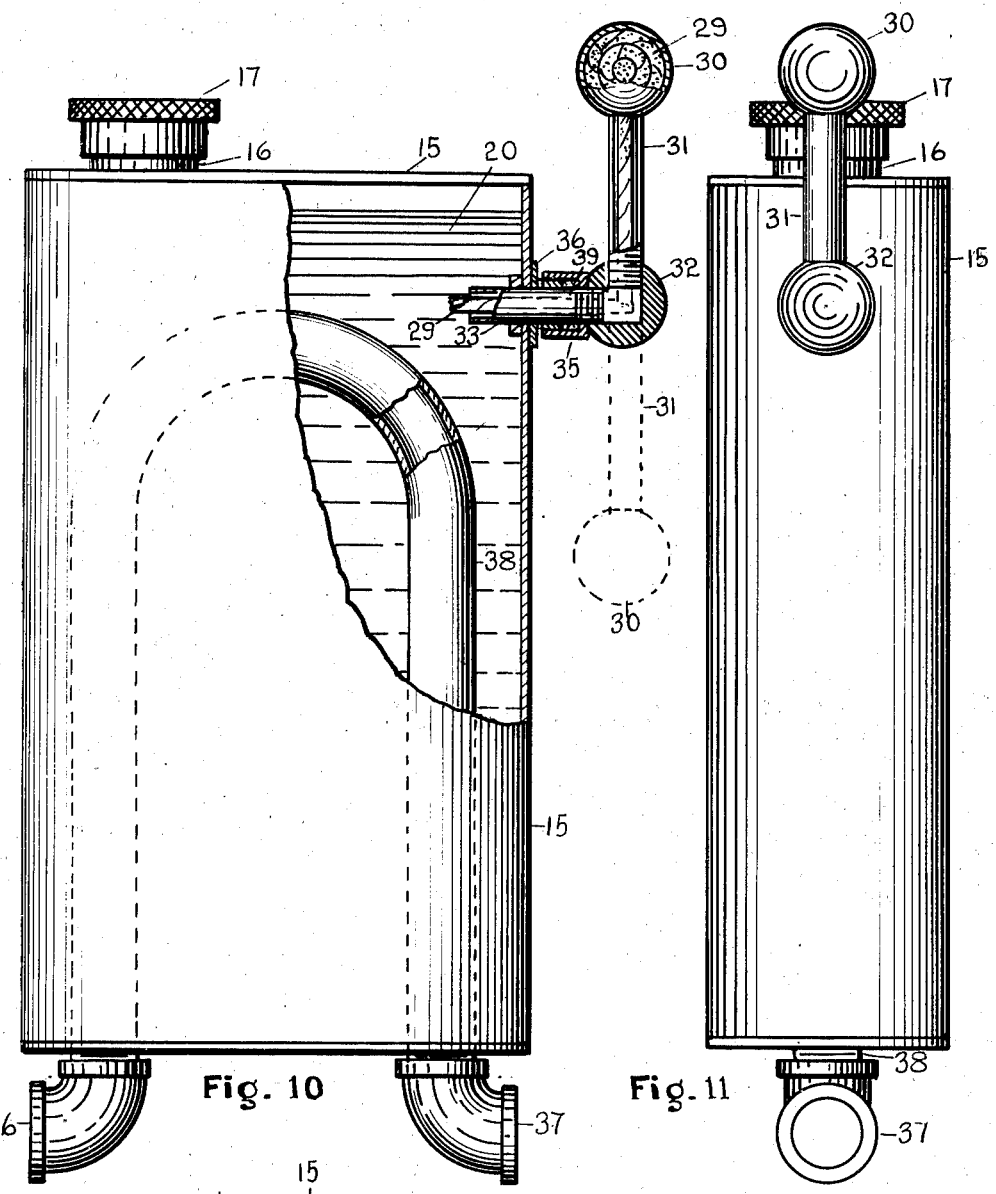

Patented July 14, 1942

2,289,425

UNITED STATES PATENT OFFICE 2,289,425

DEVICE FOR ACCUMULATING, RETAINING, AND DISCHARGING HEAT

George Lewis Hogan, Miami, Fla.; Georgia Mae Hogan, administratrix of George Lewis Hogan, deceased, assignor to Georgia Mae Hogan and Ethyl Conway Hogan, both of Lebanon, Ky.

Application September 14, 1939, Serial No. 294,885

11 Claims. (Cl. 126—263)

The present invention relates in general to a thermophoric device or battery for accumulating, storing and discharging heat in which the active medium is a composition containing an exothermic chemical or compound adapted to absorb heat while being reduced from a crystalline to liquid condition, and give forth heat when returning from a liquid to crystalline condition.

It is a primary object of the herein described invention to provide an improved device of such character which is arranged to absorb heat from a separate heat source, such as steam, engine exhausts, solar heat, and the like, whereby heat that would normally be wasted may be stored and utilized at a future time.

A further object of the invention is to provide a novel container for the active medium; and imroved means for discharging heat from this medium, which will be dependable in operation and unaffected by climatical changes.

A still further object of the herein described invention is to provide an improved active medium containing ingredients for controlling the speed of recrystallization of the medium, and more specifically, which will retard the speed of recrystallization and prevent crystallization of the medium into an objectionably hard mass.

Other objects and features of the invention will more fully appear from the following detailed description taken in connection with the accompanying drawings which illustrate several embodiments thereof, and in which:

Figure 1 is a front elevational view of one embodiment of the present invention;

Figure 2 is a plan view of the same;

Figure 3 is an enlarged sectional detailed view taken through a sealing cap for the container of my device;

Figure 4 is a fragmentary elevational view of a modified form of construction of the device partly in section to show certain details of its construction;

Figure 5 is an enlarged detail view of a part of the sealing and discharging unit of this modified construction;

Figure 6 is a sectional view taken through this part, substantially on plane (A) of Figure 5;

Figure 7 is a plan view of the modified construction of the device;

Figure 8 is a perspective view of a discharging unit such as utilized with the device of the present invention;

Figure 9 is a fragmentary view of the modified form of construction, showing the manner in which the discharging unit is utilized with the modified form of construction;

Figure 10 is a front elevational view of a further modified construction in which the discharging unit is arranged as a part of the device assembly;

Figure 11 is a side elevational view of the same; and

Figure 12 is a fragmentary plan view of the same.

As shown on the drawings:

In general, the present invention embodies a normally sealed container which is charged with a chemical mixture which has the ability to absorb heat while being converted from a crystalline to a liquid condition and give up heat when returning from a liquid to a crystalline condition. The embodiment further includes novel means for controlling the chemical mixture at the will of the user for restoration of the device to its potential condition.

While there are a number of known chemicals and compounds capable of giving up heat under the conditions specified in connection with the present invention, I have found that a mixture containing an exothermic salt such as sodium thiosulphate in small crystals is best suited to produce the desired result. These crystals are put into the container and there is then added an approximately two to five per cent mixture of water and a sugar such as glucose mixed in equal parts for the purpose of retarding the speed of crystallization during operation of the device and preventing the mass from crystallizing into an undesirably hard condition. Such a composition insures that when the crystals of the active medium are melted, the liquid will not be too sensitive and start recrystallization before the time when it is desired to utilize the device.

In the several constructional forms of my device as disclosed herein, the intensity of the heat liberated upon recrystallization of the composition or mixture may be predetermined and varied according to the amount of dilution of the active medium in the container charge.

As illustrative of one form of the invention I have shown in Figure 1 a device of simple construction which comprises a suitable container 15 which is charged with the composition described above. This container may be of any convenient shape to best adapt it for its intended use and may be constructed of any suitable material such as metal, rubber or suitable composition. This container has a filler neck 16 which is threaded to receive a closure in the form of a screw cap 17, the same being internally threaded to screw over the outside of the neck. A gasket 19 of suitable material is secured on the under surface of the cap top for engagement with the filler neck to form an air-tight seal, when the cap is screwed onto the neck.

Referring to Figures 4, 5 and 6, I have illustrated a modified construction which may be more conveniently utilized than the simple device disclosed in Figure 1. In this modification, the cap 17 is formed with a central threaded opening into which a threaded screw 21 may be screwed so as to extend into the charge of the container, this charge being shown at 20 in crystal form, in Figure 4. The screw 21 contains a milled head 22 whereby it may be turned for insertion and retraction into and from the container charge. In order to make an air-tight seal between the cap and the screw, there is interposed between the under side of the screw head and the top of the cap a suitable sealing gasket 23 which will be tightly compressed between the head and cap, when the screw is screwed home. The shank of the screw just described is provided with one or more grooves 24—25 which define longitudinally extending cutting edges along the shank to enable the screw to cut its way through the threads of the cap opening in the event that these threads become clogged with crystals which might be formed thereon by a portion of the charge in the container. Such an arrangement assures that the screw will not become stuck and may always be actuated to a proper seating position of the gasket 23.

For utilization with the devices shown in Figures 1 and 4, I have provided a discharging unit as clearly shown in Figure 8. This unit specifically comprises an elongate strip 27 of rigid material such as a suitable metal, this strip being deflected at one end to form a ring-shaped portion 28. Over the opposite end of the strip 27, a strip of porous material 29 of a suitable cloth or other porous material is folded so as to cover both sides of the end portion of the strip. This strip 29 may have its ends secured by a suitable clamp or band 26.

The strip 29 is impregnated with crystals of the same composition comprising the container charge. Since these crystals are sensitive to moisture and are frequently exposed to atmospheric conditions that would render them inactive, I have utilized a moisture resisting binder for the crystals which are used to impregnate the strip 29. For such purpose I add about three per cent of potassium alum to the crystals and bind this mixture with a cement containing cellulose. A discharge unit as thus constructed has been found to be extremely dependable and to function even in the dampest climates.

In use, the devices illustrated in Figures 1 and 4, after having been charged with the composition previously described, are sealed and are then ready for use. By placing the container in boiling water for a few minutes, the composition in the container will be melted. The container may then be set aside to cool and will retain the heat absorbed from the boiling water until it is desired to release the same.

In order to discharge or cause the device shown in Figure 1 to release its stored heat energy, the container is agitated to cause a portion of the liquid therein to adhere to the surface of the cap sealing gasket 19. This cap is then removed and the liquid adhering to the gasket is contacted by the strip 29 of the discharge unit. This will cause the liquid on the gasket to start to crystallize, whereupon the cap is then screwed back in sealing position on the container. By agitating the container again so as to cause the container charge to contact the inside of the cap, the charge in the container will start crystallizing and heat will be emitted or given off as this crystallization proceeds. In order to recharge the device it is only necessary to immerse the container again in boiling water as described above or subject it to any other available source of heat.

The device of Figure 4 is charged in the same manner, but is discharged in a slightly different way. In this construction, the container is agitated to cause liquid to contact the threaded shank portion of the screw 21. If this screw is now unscrewed in the manner shown in Figure 9, a portion of the screw thread which has contacted the liquid will be brought to the exterior of the container where it may be contacted by the strip 29 of the discharge unit in the same manner as described before in connection with the container shown in Figure 1. This starts crystallization of the liquid on the screw thread, whereupon screwing of this screw so that its threaded end again projects into the container will carry the crystals thereon into the container liquid. By again shaking the device the crystallization which has started on the screw will be continued into the container charge and heat will be emitted from the device.

Referring to Figures 10, 11 and 12, I have illustrated a device embodying the features of the present invention, which has been modified as to its construction so as to be initially heated by passing a heated medium through the interior of the container and through the container charge. Moreover, in this construction there is provided a discharging unit which forms a part of the device ensemble.

More specifically, the container 15 is provided with a separate passageway therethrough which in this case is in the form of a U-shaped pipe 38, the ends of this pipe being brought out through the bottom of the container and provided with suitable pipe connecting fittings 36 and 37 respectively forming inlet and outlet connections to the pipe. By connecting the pipe 38 to a source of heat energy such as a steam line, engine exhaust or any other suitable source, the heated medium may be passed through the pipe 38 to cause the charge in the container to be liquified in the same manner as previously described.

For discharging this form of the device, I have provided a discharge unit which comprises a tubular member 33 that passes through the container wall adjacent its upper end and is supported in a suitable bushing 36 in the wall for enabling rotational movements of the tubular member. This member is so positioned that it will have its innermost end disposed below the level of the charge in the container. This bushing contains the usual packing nut 35 for forcing a packing 39 against the outermost end of the tube to prevent leakage along the tube from the interior of the container. At the outermost end of the tube 33, I have provided a ball-shaped fitting 32 for connecting the tube 33 with a right angled tubular member 31. The member 31 at its outer end is connected and communicates with the interior of a hollow container 30. A wick 29 is loosely disposed in the members 31, 32 and 33 and extends into the container where it is wound or otherwise formed. The portion of the wick lying within the container 30 is impregnated with the moisture proofed crystals in the same manner as the strip 29 of the previously described discharge unit. It is preferred that this wick be made slightly smaller than the passage in which it is disposed in order to permit the charge in the container, when liquified, to flow along the outer surface of the wick between this surface and the inner surface of the associated passageway.

In operation of the discharging unit, it will be apparent that if the container 30 which cooperates with the tubular member 31 to form a handle is now rotated to the position shown in dotted lines in Figure 10, liquid will flow along the wick and enter the container 30 where it will contact the impregnated portion of the wick and start to crystallize. If the container 30 is now moved to the position shown in full lines in Figure 10, the liquid in the container 30 which has now started to crystallize will flow back into the container and thus start crystallization of the container charge and emit heat in the same manner as the devices previously described.

It will be appreciated that this invention may be practiced by various forms of construction of the device, and that the device may be utilized with any source of heat even to the extent of focusing solar rays upon the container or passing a medium through the pipe 38 which has been subjected to solar radiation.

From the foregoing description, it will be apparent that the present invention provides an improved thermophoric device or battery for accumulating, storing and discharging heat, which is arranged to absorb heat from a separate heat source, such as steam, engine exhausts, solar heat, and the like; which utilizes an improved active medium containing ingredients for controlling the speed of crystallization of the medium and prevent crystallization of the medium into an objectionably hard mass; and which embodies improved means for discharging the medium, which will be dependable in operation and unaffected by climatical changes.

It is, of course, to be understood that although I have described in detail several embodiments of the invention, the invention is not to be thus limited, but only in so far as defined by the scope and spirit of the appended claims.

I claim as my invention:

1. A device of the character described comprising a container charged with a liquid composition containing a crystallizable compound, said composition being capable of releasing heat by crystallization of said compound, a discharging unit, and a permanent crystal of said compound carried by said unit, said unit being manually operable to bring said crystal into contact with said composition to cause crystallization of said compound.

2. A device of the character described comprising a container charged with a liquid composition containing a crystallizable compound, said composition being capable of releasing heat by crystallization of said compound, an auxiliary container, a crystal of said compound within the auxiliary container, and a flow connection between said containers, said auxiliary container being arranged for positioning at different levels to cause reversed flows of the composition between the containers.

3. A device of the character described comprising a container charged with a liquid composition containing a crystallizable compound, said composition being capable of releasing heat by crystallization of said compound, an auxiliary container, a crystal of said compound within the auxiliary container, a flow connection between said containers entering the first container below the level of said composition, and means mounting the connection for swinging movements to positions selectively disposing the auxiliary container above and below the level of the composition to cause reversed flows of the composition between the containers.

4. A device of the character described comprising a sealed container charged with a liquid composition containing a crystallizable compound, said composition being capable of releasing heat by crystallization, an elongate retractible member arranged to extend into the container and having a longitudinally extending surface groove, and discharging means capable of contacting said retracted member.

5. A device of the character described comprising a sealed container charged with a liquid composition containing a crystallizable compound, said composition being capable of releasing heat by crystallization, a rotatably mounted retractible member arranged to extend into the container, said member having a longitudinally extending surface groove defining cutting edges, and discharging means capable of contacting said retracted member.

6. A device of the character described comprising a sealed container charged with a liquid composition containing a crystallizable compound, said composition being capable of releasing heat by crystallization, and a unit for discharging the device by contacting said composition, said unit including a fibrous material impregnated with crystals of said compound, and a handle mounting for said material thereon.

7. A thermophoric device including a container, a liquid composition disposed within the container and containing a crystallizable compound, said composition being capable of releasing heat by crystallization of said compound, crystals of said compound coated with a moisture-proofing medium, and means for exposing a surface of said crystals and for contacting the exposed crystal surface with said composition to cause crystallization of said compound.

8. A thermophoric device comprising a container, a liquid composition disposed within the container and including a crystallizable compound, said composition being capable of releasing heat by crystallization of said compound, crystals of said compound, a cement for rendering said crystals moisture proof, and means for laying at least some crystal surface bare and for contacting the bare crystal surface with said composition to cause crystallization of said compound.

9. A thermophoric device comprising a container, a liquid composition disposed within the container and including a crystallizable compound, said composition being capable of releasing heat by crystallization of said compound, crystals of said compound, a cement containing cellulose for rendering said crystals moisture proof, and means for laying at least some crystal surface bare and for contacting the bare crystal surface with said composition to cause crystallization of said compound.

10. A thermophoric device comprising a container, a liquid composition disposed within the container and including a crystallizable compound, said composition being capable of releasing heat by crystallization of said compound, crystals of said compound mixed with potassium alum, a moisture proof binder cement for said crystals, and means for laying at least some crystal surface bare and for contacting the bare crystal surface with said composition to cause crystallization of said compound.

11. A thermophoric device comprising a container, a solution of a crystallizable compound disposed within the container which solution on being contacted with a crystal of said compound will emit heat due to crystallization of said compound induced by said contact, a plurality of crystals of said compound, a moisture proof binder composition cementing said crystals, said cemented crystals being capable of inducting crystallization of said compound by being rubbed against an inside wall area of said container wetted by said solution, if said solution is thereafter contacted with the rubbed area, and means for rubbing said cemented crystals against an inside container surface wetted with said solution.

GEORGE LEWIS HOGAN.